(12) United States Patent
Ishihara

(10) Patent No.: US 6,918,556 B2
(45) Date of Patent: Jul. 19, 2005

(54) RECORDING TAPE CARTRIDGE

(75) Inventor: Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 18 days.

(21) Appl. No.: 10/611,669

(22) Filed: Jul. 2, 2003

(65) Prior Publication Data

US 2004/0041051 A1 Mar. 4, 2004

(30) Foreign Application Priority Data

Jul. 4, 2002 (JP) .......................................... 2002-196081

(51) Int. Cl.$^7$ .......................................... G11B 23/107
(52) U.S. Cl. ................................................ 242/348.2
(58) Field of Search .............................. 242/348.2, 348, 242/332.4; 360/132

(56) References Cited

U.S. PATENT DOCUMENTS 5,465,187 A   11/1995  Hoge et al.
6,445,539 B1   9/2002  Morita et al.
2001/0028011 A1 * 10/2001 Shiga et al. ............. 242/348.2
2002/0079396 A1 *  6/2002 Ridl et al. ............... 242/348.2

FOREIGN PATENT DOCUMENTS

JP          11-213614        8/1999

* cited by examiner

*Primary Examiner*—John M. Jillions
(74) *Attorney, Agent, or Firm*—Sughrue Mion, PLLC

(57) ABSTRACT

A recording tape cartridge has: a reel; a recording tape, one end of the recording tape being anchored at the reel, and the recording tape being wound on the reel; a leader member attached to another end of the recording tape; a case having an opening for pulling-out of the leader member, the case rotatably accommodating the reel; and holding portions formed at a ceiling surface and a floor surface of the case, and holding the leader member in a vicinity of the opening, wherein the holding portions have cut-outs which are continuous from the opening, and sides of the cut-outs near the opening are open. The leader member has an anchor portion at each end portion of the leader member, and the anchor portions are inserted into the cut-outs.

16 Claims, 15 Drawing Sheets

RECORDING TAPE CARTRIDGE

CROSS-REFERENCE TO RELATED APPLICATION

This application claims priority under 35USC 119 from Japanese Patent Application No. 2002-196081, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly for computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out mechanism provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By driving the reel of the magnetic tape cartridge and the take-up reel of the drive device synchronously, data can be recorded onto the magnetic tape, and data recorded on the magnetic tape can be played back.

Such a magnetic tape cartridge requires little space for storage thereof, and a large amount of information can be recorded thereon. The position of the opening and the type of the door which opens and closes the opening differ for each type of leader member. For example, as shown in FIG. 14, in a case in which the magnetic tape cartridge is a cartridge having a leader pin 60 attached to an end portion of a magnetic tape T wound around a reel 72, an opening 68 for pulling-out of a leader pin 60 is formed in a side wall 64 of a case 62. The opening 68 is opened and closed by a door 66 which slides in the direction of loading the magnetic tape cartridge into a drive device (the direction of arrow P) and the direction opposite thereto.

A pair of upper and lower pin holding portions 70, which hold the leader pin 60 when the magnetic tape cartridge is not being used (e.g., is being stored or the like), are provided at the inner side of the opening 68 of the case 62. As shown in FIG. 15A, the pin holding portions 70 are concave portions which are substantially semicircular in plan view, and portions thereof are open such that the leader pin 60 can enter therein and exit therefrom (e.g., Japanese Patent Application Laid Open (JP-A) No. 11-213614). Both end portions 60A of the leader pin 60 which is in an upright state are inserted into these concave portions (i.e., the pin holding portions 70).

However, with such pin holding portions 70, when the case 62 is dropped from the opening 68 side thereof, as shown in FIG. 15B, there are cases in which the case 62 flexurally deforms toward the top and bottom outer sides due to the impact of the drop. In this case, there is a possibility that the leader pin 60 may fall out from the pin holding portions 70.

SUMMARY OF THE INVENTION

An object of the present invention is to provide a recording tape, cartridge in which, even if a case is dropped, a leader member, such as a leader pin or the like, does not come out from holding portions due to the impact of the drop.

A first aspect of the present invention provides a recording tape cartridge which comprises: a reel; a recording tape, one end of the recording tape being anchored at the reel, and the recording tape being wound on the reel; a leader member attached to another end of the recording tape; a case having an opening for pulling-out of the leader member, the case rotatably accommodating the reel; and holding portions formed at a ceiling surface and a floor surface of the case, and holding the leader member in a vicinity of the opening, wherein the holding portions have cut-outs which are continuous from the opening, and sides of the cut-outs near the opening are open.

Further, the leader member has an anchor portion at each end portion of the leader member, and the anchor portions are inserted into the cut-outs.

In accordance with the above-described structure, the leader member is anchored at the case (holding portions) due to anchor portions being inserted in cut-outs provided from an opening toward the holding portions. Namely, the leader member, in an upright state, spans the case in a vicinity of the opening. Accordingly, the leader member can suppress the flexural deformation, toward the top and bottom outer sides, of the case in a vicinity of the opening due to impact or the like at the time when the recording tape cartridge is dropped. Thus, breakage of the case can be suppressed, and it is possible to prevent the leader pin from falling out of the pin holding portions.

A second aspect of the present invention provides a leader pin to which is fixed one end of a recording tape which is wound on a reel rotatably accommodated in a case which has an opening and cut-outs in a vicinity of the opening, the leader pin comprising: a shaft portion; a fixing portion which is provided coaxially with the shaft portion, and to which the one end of the recording tape is fixed; and anchor portions inserted into the cut-outs of the case.

A third aspect of the present invention provides method of manufacturing a recording tape cartridge having a case, the method comprising the steps of: fixing and winding one end of a recording tape on a reel; attaching a leader member, which has an anchor portion at each end portion of the leader member, to another end of the recording tape; providing, at the case, an opening for pulling-out of the leader pin; providing cut-outs in a vicinity of the opening; and accommodating the reel in the case.

A fourth aspect of the present invention provides a method of holding a leader pin to which is fixed one end of a recording tape wound on a reel rotatably accommodated in a case, the method comprising the steps of: inserting the leader pin in cut-outs of the case; and holding the leader pin by holding members.

DETAILED DESCRIPTION OF THE INVENTION

Hereinafter, a recording tape cartridge 10 relating to an embodiment of the present invention will be described with reference to FIGS. 1 through 4. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
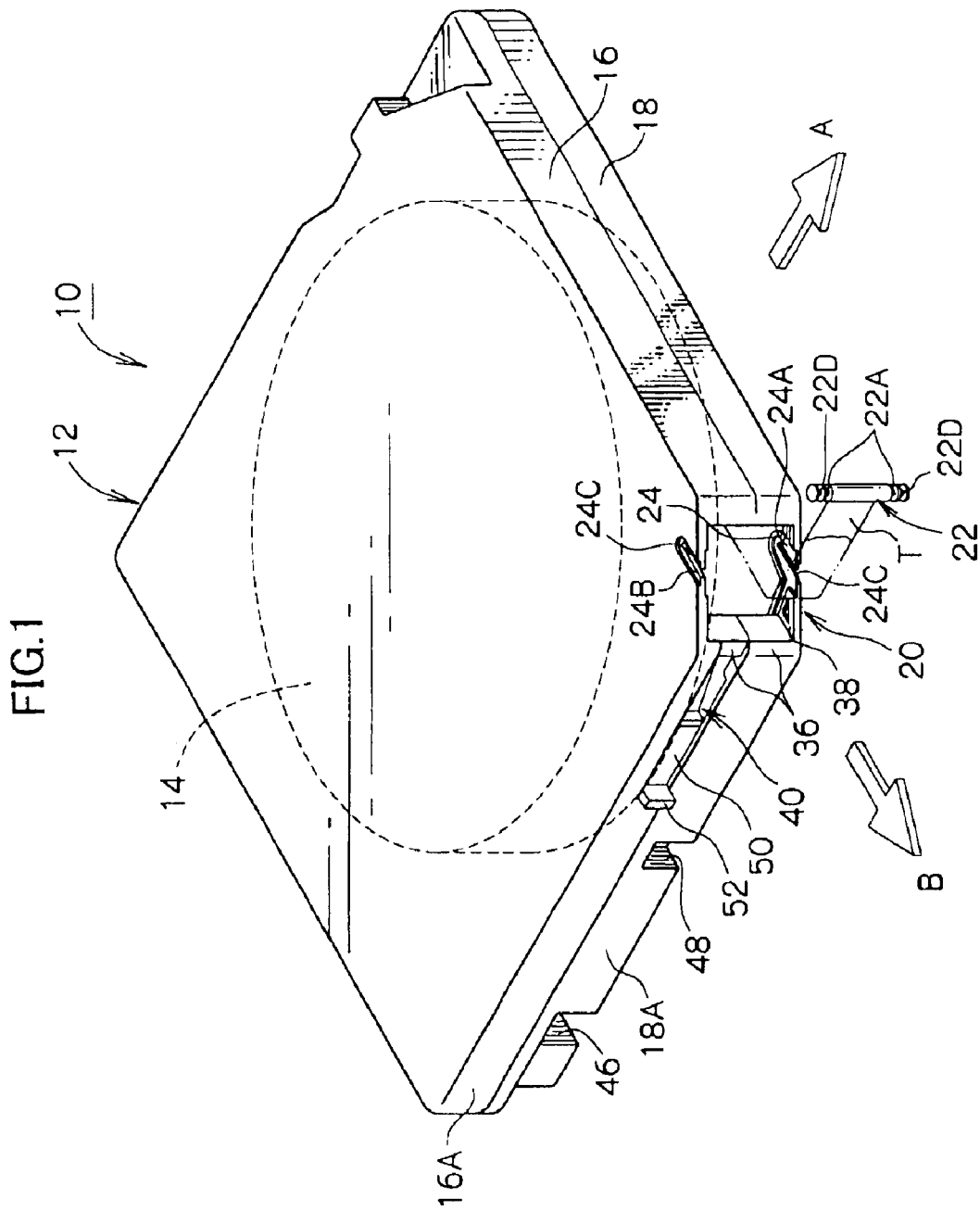
FIG. 1 is a schematic perspective view of a recording tape cartridge relating to an embodiment of the present invention.
Figure 2:
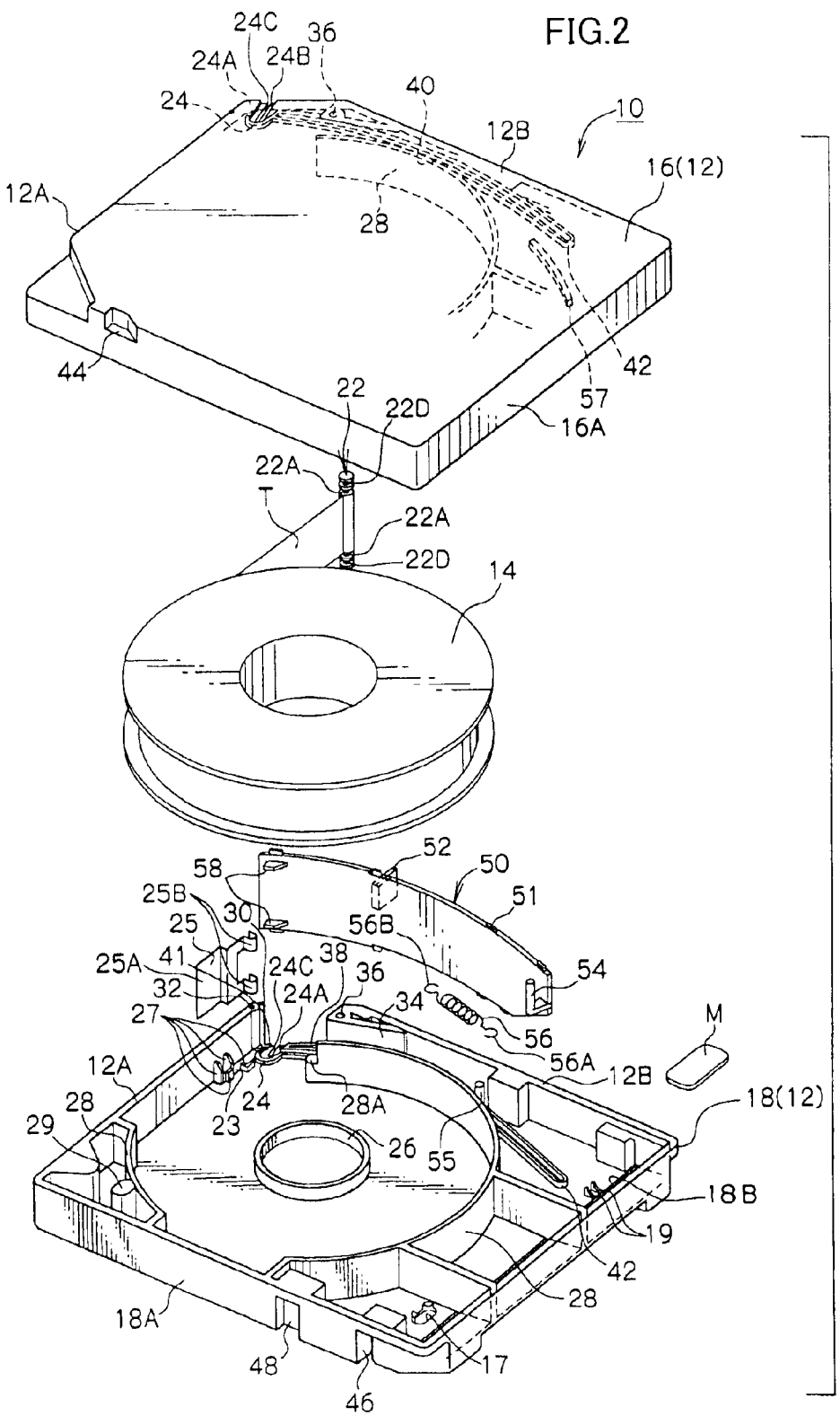
FIG. 2 is a schematic exploded perspective view of the recording tape cartridge of FIG. 1.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by peripheral walls 16A and 18A of an upper case 16 and a lower case 18 being set to oppose one another and being joined together. At each of the peripheral walls 16A, 18A, the front right corner portion, which is one corner portion at the leading side in the direction of loading the recording tape cartridge 10 into a drive device, is cut obliquely as seen in plan view. A space for accommodating the reel 14, on which the magnetic tape T is wound, is provided at the interior of the case 12.

The cut corner portions of the peripheral walls 16A, 18A of the upper case 16 and the lower case 18 form an opening 20 for pulling-out of the magnetic tape T. A leader pin 22, serving as a leader member, which is pulled-out while being anchored or engaged by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull out mechanism. In this way, the hooks or the like do not contact and scratch the magnetic tape T at the time of pulling-out the magnetic tape T.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

A hollow portion 28A, in which a hole for position regulation is formed, is provided so as to be continuous with the end portion of the play restricting wall 28 in a vicinity of the opening 20. Further, a hollow portion 29, in which is formed a hole for position regulation which is a long hole, is provided so as to be set apart from the play restricting wall 28 at the inner side of the front left corner portion of the case 12. The hollow portions 28A, 29 are disposed on a single straight line which extends along the direction of arrow B. The end portions of the play restricting walls 28, except for the end portion thereof at which the hollow portion 28A is continuously formed, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle, and the memory board M is supported by supporting projections 19 and is disposed so as to be inclined at a predetermined angle, such that sensing is possible at a drive device which reads the various information stored in the memory board M from the bottom surface side of the recording tape cartridge 10, and at a library device (a device which accommodates a plurality of the recording tape cartridges 10 and which automatically loads and removes the recording tape cartridges 10 from drive devices) which reads the various information stored in the memory board M from the rear wall side of the recording tape cartridge 10.

Further, an unillustrated write protect portion, which is set so that recording onto the recording tape cartridge 10 is possible or is not possible, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are provided at the right end portion of a front wall 12A of the case 12. The inclined wall portions 30 are bent along the plane of opening of the opening 20. Due to the distal end of a door 50, which is substantially arc-shaped in plan view and which will be described later, entering in at the inner side of the inclined wall portions 30 when the opening 20 is closed, the inclined wall portions 30 serve as dustproofing walls such that there is no space through which dust or the like can enter. Further, a pair of upper and lower screw bosses 32 are formed continuously with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. It is particularly preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in a cross-sectional view, and is recessed upwardly from the bottom surface of the case 12 as well (the floor plate is cut-out) The concave portion 48 is formed at the left wall of the case 12 as well. The concave portions 48 are engagement portions which, for example, a pull-in mechanism of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in a cross-sectional view, and is recessed upwardly from the bottom surface of the case 12 as well (the floor plate is cut-out). The concave portions 46 are engagement portions which a grasping mechanism of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 which will be described later such that the convex portions 51 are nipped from both the inner surface side and the outer surface side, stand erect at the upper case 16 and the lower case 18 from a vicinity of the opening 20 to a vicinity of the region where the play restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than pin holding portions 24 which will be described later).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward of the front ends of the pin holding portions 24 (which will be described later), so as to not impede the entry and exit of the leader pin 22. The interval (groove width) of the guide wall portion 41 is formed so as to be slightly more narrow than the interval (groove width) of the guide wall portion 42.

Namely, the interval (groove width) of the guide wall portion 42 is slightly wider so as to permit dispersion in molding of the door 50 (dispersion in the curvature). The convex portions 51 of the door 50 slide within the guide wall portions 42 in a state in which there is a certain amount of joggling. Accordingly, at least the interval (groove width) of the guide wall portion 41 is substantially the same as the width of the convex portions 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pull-out mechanism of a drive device which engages and pulls-out the leader pin 22. Accordingly, as will be described later, the plate width (height) of the front half portion of the door 50 (at least the portion thereof which closes the opening 20) is formed to be larger (higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as the guide wall portions 42. The strength of the upper case 16 and the lower case 18 at the opening 20 portion is ensured by these ribs 38.

The upper case 16 and the lower case 18 which were described above are fixed or joined together by unillustrated screws being screwed, from beneath, into screw bosses (not shown) that are disposed at predetermined positions and into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, it is difficult for the case 12 to deform or buckle, or for positional offset to arise thereat, due to the entire weight of the recording tape cartridge 10. Note that the abutting surfaces of the peripheral walls 16A, 18A (the corner portions at both sides of the opening 20) may be fixed together by welding. However, fixing together by screws is preferable in consideration of the ability to disassemble and the ability to recycle the case 12.

The opening 20 is opened and closed by the door 50 which serves as a shielding member. The plate width (height) of the door 50 at the portion thereof which slides in the guide wall portions 41 and the front half guide wall portions 42 (i.e., at least the portion of the door 50 which closes the opening 20), is formed to be substantially the same as the opening height of the opening 20. The portion of the door 50 further toward the rear thereof is formed to be slightly smaller (shorter). The plate length of the door 50 is formed to be sufficiently longer than the opening width of the opening 20. The door 50 is formed in a substantial arc-shape as seen in plan view which curves along the direction of plate thickness, such that the door 50 can move along a predetermined circumference.

The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed at an incline at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41.

The convex portions 51 project from the top surface and the bottom surface of the door 50. The convex portions 51 abut the guide surfaces of the guide wall portions 41 and the guide wall portions 42 (the inner side surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the upper surface and the lower surface of the door 50 so as to have top/bottom symmetry (except for the convex portions 51 furthest toward the rear), and so as to project to substantially the same heights as the heights of the guide wall portions 41 and the guide wall portions 42 (e.g., about 0.5 mm at the front side when the region where the plate width of the door 50 changes is considered to be a border, and about 1.5 mm at the rear side of this border). Note that the convex portions 51 furthest toward the rear do not have top/bottom symmetry because the bottom rear portion of the door 50 is cut obliquely.

The distal end of the convex portion is formed in a substantial arc-shape as seen in cross-sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped (or the like) distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced, and the door 50 can be slid smoothly with little resistance. Further, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no possibility that the convex portions 51 will break.

An operation projection 52 serving as an operation portion projects along the radial direction of the door 50 from the outer peripheral surface of the door 50 at a region which is slightly further forward than the longitudinal direction central portion of the door 50 (a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, the slit 40 is always substantially closed by the screw boss 36 and the door 50 which extends over substantially the entire height within the case 12. Further, adhesion of dust and the like to the magnetic tape T wound on the reel 14 is prevented by the play restricting walls 28 serving as inner walls.

Further, stoppers 58, which abut the upper end portion side surface and the lower end portion side surface of the leader pin 22 (disc portions 22E which will be described later) when the opening 20 is closed, project at the inner surface of the front end portion of the door 50. The stoppers 58 even further prevent the leader pin 22 from falling out from the pin holding portions 24 (which will be described later) due to impact at the time the recording tape cartridge 10 is dropped or the like. Further, a coil spring 56, which serves as an urging member which urges the door 50 in the direction of closing the opening 20, is disposed in a space between the play restricting walls 28 and the right wall 12B (the peripheral walls 16A, 18A) at the rear right corner portion and effectively utilizes the space, since the door 50 has a length such that it extends to the rear right corner portion of the case 12 in the state in which the door 50 closes the opening 20.

Namely, a spring holding portion 54, which is substantially L-shaped in rear view, projects upwardly and integrally at the inner peripheral surface of the door 50 in the vicinity of the rear end thereof. A solid cylindrical spring anchor projection 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top portion of the spring holding portion 54 slidingly contacts at the time when the door 50 is opening and closing, stands erect in a substantial arc-shape in plan view at the upper case 16. The rib 57 is disposed at a position and has a length such that the top end of the holding projection 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play restricting wall 28 and the guide wall portion 42 of the upper case 16. Thus, in the same way, the attachment portion 56B can be prevented from coming off of the spring anchor portion 55.

Figure 3:
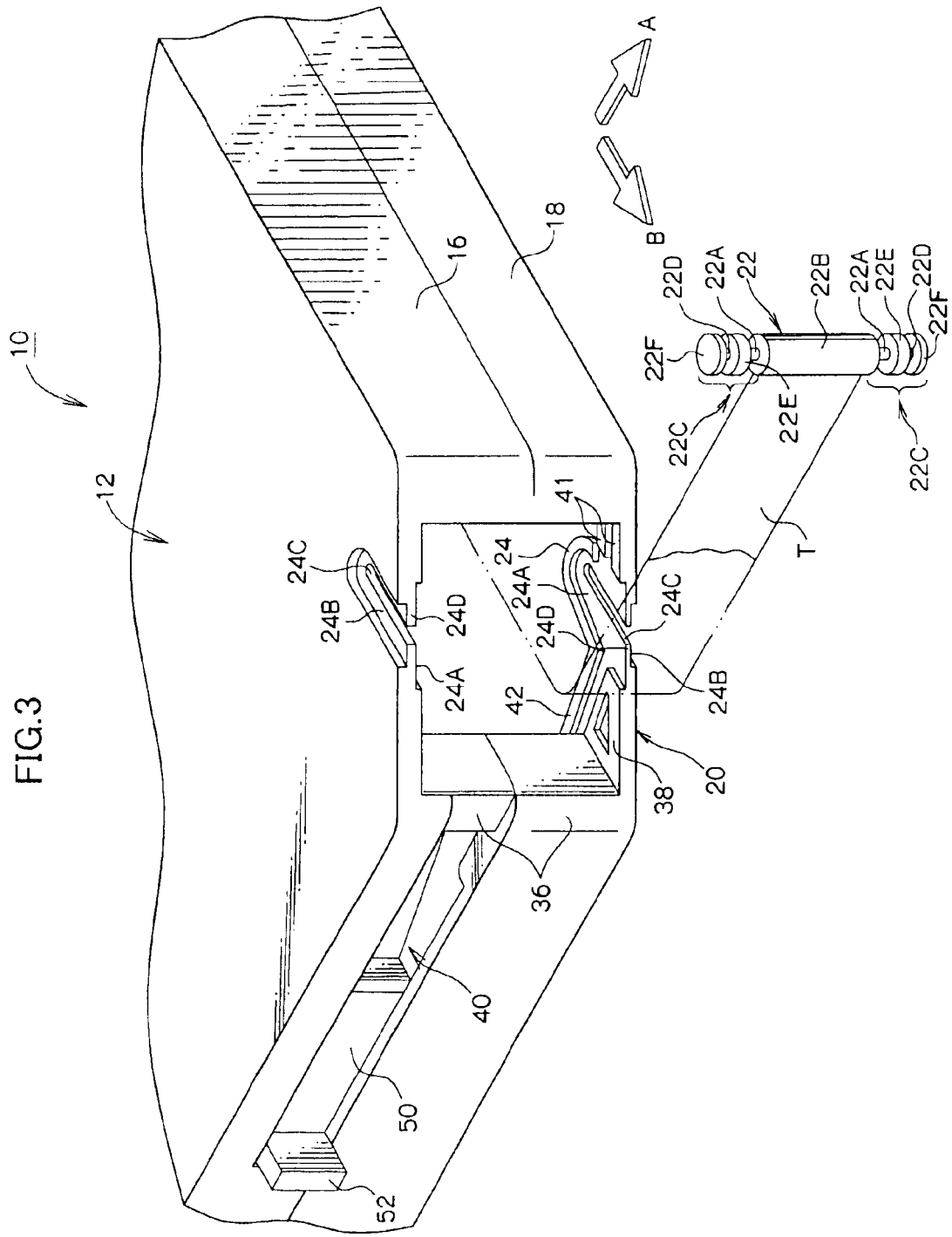
FIG. 3 is a schematic enlarged perspective view showing a state in a vicinity of an opening of the recording tape cartridge of FIG. 1.
Figure 4:
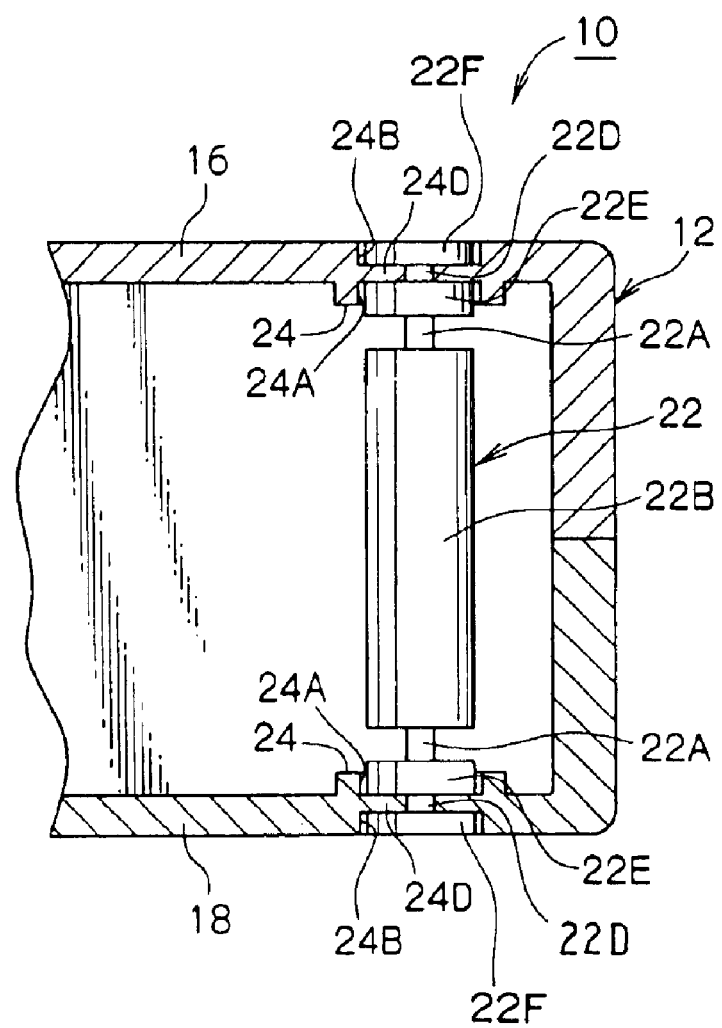
FIG. 4 is a schematic side sectional view showing a state in which a leader pin of FIG. 1 is held in a case.

Next, the leader pin 22 and the pin holding portions 24, which serve as holding portions thereof, relating to the to the present invention will be described. As shown in FIGS. 3 and 4, the leader pin is metal or resin, and is formed by: a fixing portion 22B to which the magnetic tape T is fixed; the annular grooves 22A which are provided at both sides of the fixing portion 22B and which are engaged by the pull-out mechanism (hooks or the like) of a drive device; and anchor portions 22C which are provided at both sides of the annular grooves 22A and which are inserted into cut-outs 24C of the pin holding portions 24 which will be described later. An annular groove 22D, the disc portion 22E and a disc portion 22F are provided at the anchor portion 22C. A thin portion 24D between concave portions 24A, 24B of the pin holding portion 24 is inserted in the annular groove 22D. An anchor spring 25, which will be described later, abuts the disc portion 22E. The disc portion 22F is exposed to the outside of the case 12. That is, the annular groove 22D is formed between the disc portion 22E and the disc portion 22F.

The pair of upper and lower pin holding portions 24, which position and hold the leader pin 22 at the interior of the case 12, are provided at the ceiling surface (the inner surface of the upper case 16) and the floor surface (the inner surface of the lower case 18) in a vicinity of the opening 20 of the case 12. As shown in FIG. 3, the pin holding portion 24 is formed in a substantially semicylindrical shape such that the magnetic tape T pull-out side thereof is open. The concave portion 24A is formed at the inner side of the pin holding portion 24. Note that the pin holding portions 24 are continuously provided so as to be integral with the guide wall portions 42 at the inner sides. The heights of the pin holding portions 24 are preferably formed to be substantially the same as or greater than the heights of the guide wall portions 42 with which they are integrally continuous.

The concave portions 24B, which have substantially the same shape as or are slightly smaller than the concave portions 24A, are formed at the outer surface of the case 12 (the outer surface of the upper case 16 and the outer surface of the lower case 18) so as to front-back correspond to the concave portions 24A. The depths of the concave portions 24B are preferably depths such that, when the leader pin 22 is anchored and held at the case 12, disc portions 22F, which are the topmost and bottommost end portions of the leader pin 22 (i.e., which are positioned at the anchor portions 22C further toward the outer sides than the annular grooves 22D) do not project further than the outer surfaces of the case 12 as seen in side view. Namely, the depths of the concave portions 24B are preferably the same as or greater than the thicknesses of the disc portions 22F. The entire length of the leader pin 22 is preferably substantially the same as the height of the case 12.

The cut-outs 24C, which are long and thin, are provided so as to be directed toward the opening 20 from the substantial centers of the concave portions 24A, 24B. The cut-outs 24C are for permitting fitting-in of the thin portions 24D between the concave portions 24A, 24B into the annular grooves 22D of the leader pin 22, and are permitting portions into which the bottom portions (shaft portions) of the annular grooves 22D of the leader pin 22 are inserted. Accordingly, the width of the cut-out 24C is substantially the same as (is the same as or is slightly larger than) the diameters of these bottom portions (shaft portions). The width, i.e., the interval, of the annular groove 22D is substantially the same as (is the same as or is slightly larger than) the thickness of the thin portion 24D between the concave portions 24A, 24B.

Figure 5:
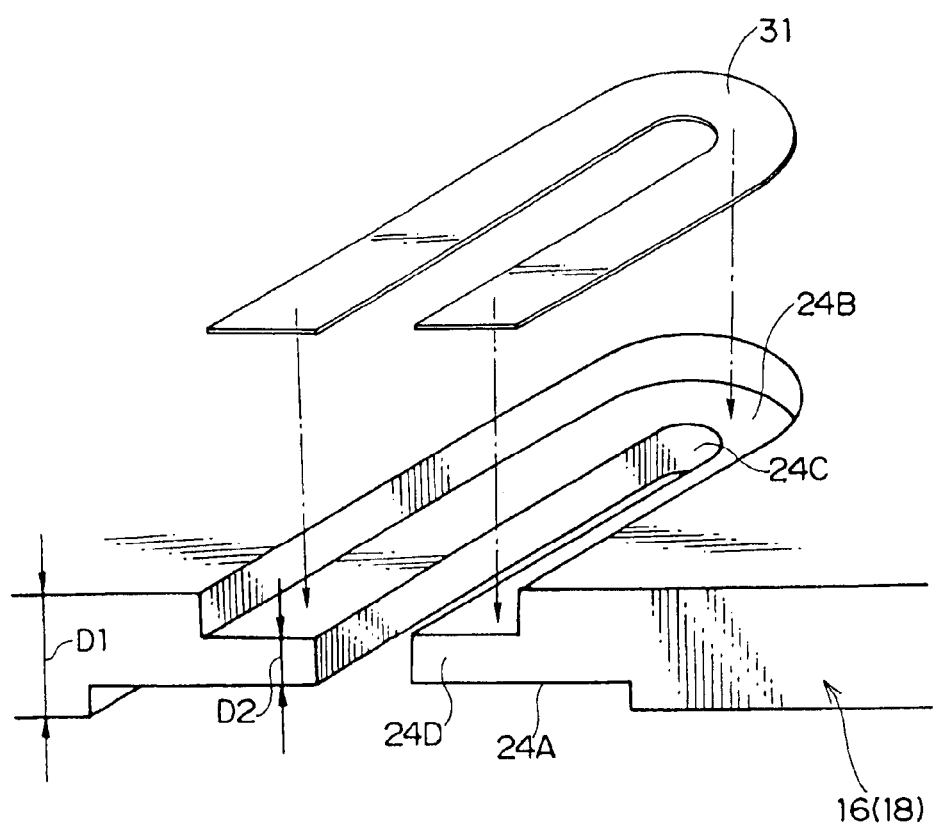
FIG. 5 is an enlarged schematic perspective view showing a vicinity of a pin holding portion relating to the embodiment of the present invention.

As shown in FIG. 5, a thickness D1, at least in a vicinity of the opening 20, of the upper case 16 and the lower case 18 is, at maximum, D1=3 mm. Accordingly, a thickness D2 of the thin portion 24D is preferably D2=0.7 mm to 2.5 mm. Further, a thin metal plate 31, which is substantially U-shaped in plan view, may be adhered to the top surface and/or the bottom surface of the thin portion 24D (i.e., the concave portion 24A and/or the concave portion 24B), so as to reinforce the thin portion 24D.

Figure 6:
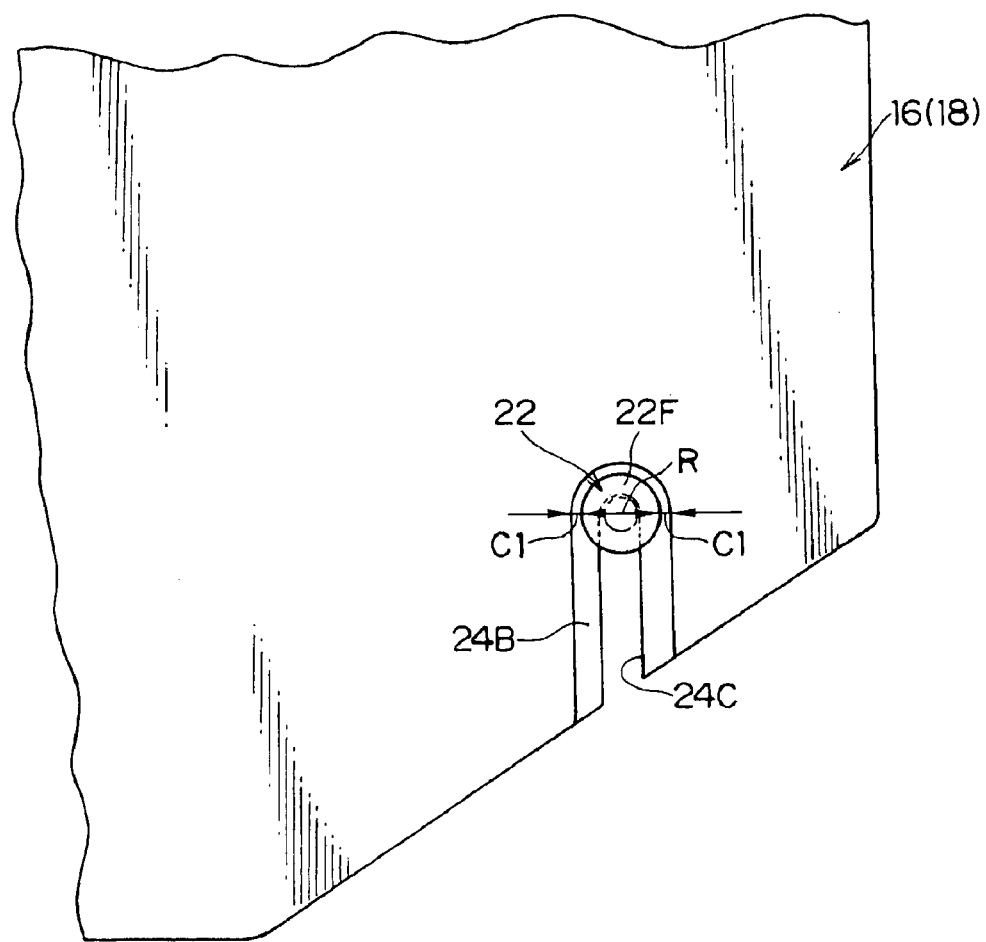
FIG. 6 is an enlarged schematic plan view showing the vicinity of the pin holding portion shown in FIG. 5.
Figure 7:
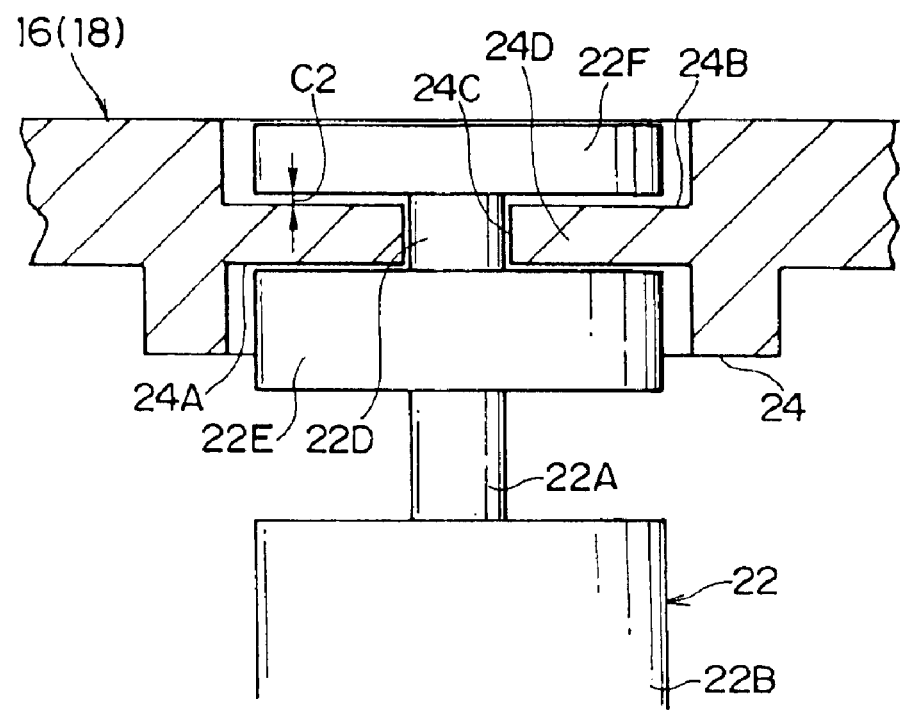
FIG. 7 is an enlarged schematic side view showing the vicinity of the pin holding portion shown in FIG. 5.

Moreover, when the bottom portion (shaft portion) of the annular groove 22D of the leader pin 22 is inserted in the cut-out 24C, the clearance between the disc portion 22F and the concave portion 24B is 0.05 mm to 0.5 mm. Namely, as shown in plan view in FIG. 6, a clearance C1 between the peripheral wall surface of the concave portion 24B and the peripheral surface of the disc portion 22F is C1=0.05 mm to 0.5 mm. Moreover, as shown in side view in FIG. 7, a clearance C2 between the top surface of the thin portion 24D (the concave portion 24B) and the bottom surface of the disc portion 22F is C2=0.05 mm to 0.5 mm. Note that the diameter R of the disc portion 22F is R=1.6 mm.

The leader pin 22 and the pin holding portions 24 have the above-described structures. The leader pin 22, which is in an upright state, is anchored and held at the case 12 by the annular grooves 22D, which are formed at the anchor portions 22C at both ends of the leader pin 22, being fit into the thin portions 24D between the concave portions 24A, 24B of the pin holding portions 24 from the open sides thereof so as to be able to enter therein and exit therefrom. Accordingly, as shown in FIG. 4, the leader pin 22 functions as a supporting connecting member which spans between and joins the upper case 16 and the lower case 18. In this way, the strength of the case 12 can be improved.

Figure 15A:
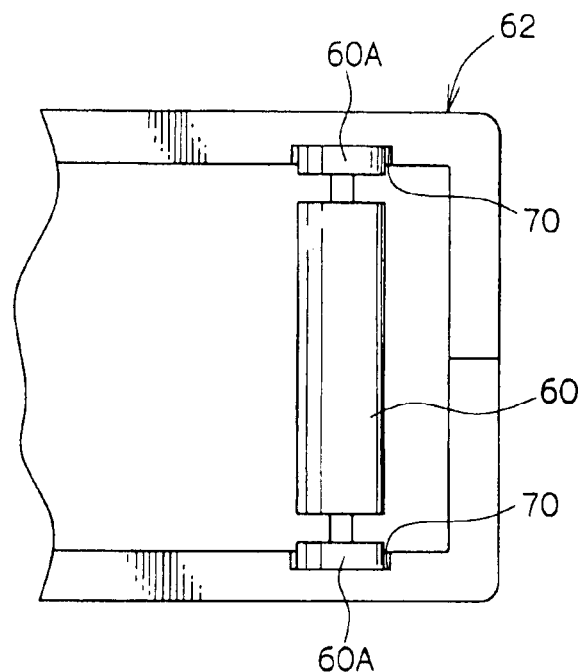
FIG. 15A is a schematic enlarged view showing a vicinity of an opening portion of the recording tape cartridge of FIG. 14.
Figure 15B:
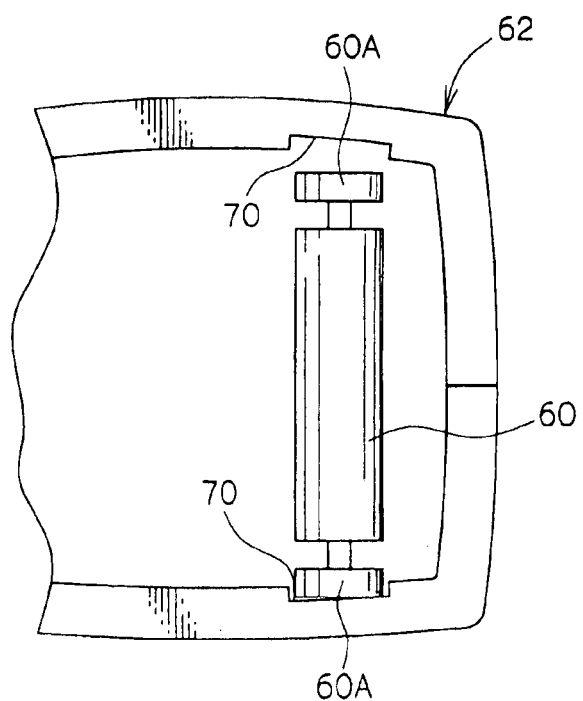
FIG. 15B is a schematic explanatory diagram showing a state in which the vicinity of the opening portion shown in FIG. 15A deforms due to impact at the time when the recording tape cartridge of FIG. 14 is dropped.

Namely, even if the opening 20 portion of the case 12 attempts to flexurally deform toward the upper and lower outer sides due to the impact at the time of a drop as in the conventional art (as shown in FIG. 15B), the leader pin 22 spans between and joins the upper case 16 and the lower case 18 at the opening 20 portion of the case 12. Thus, flexural deformation of the case can be suppressed by the leader pin 22. Accordingly, damage to the case 12 can be suppressed, and the leader pin 22 can be prevented from falling out from the pin holding portions 24.

By providing the cut-outs 24C, gaps which communicate the interior and the exterior of the case 12 are formed in a vicinity of the opening 20. However, the aforementioned stoppers 58 are positioned at the concave portion 24A sides of the cut-outs 24C. Therefore, when the recording tape cartridge 10 is not being used (such as is being stored or the like), the gaps formed by the cut-outs 24C are always closed by the stoppers 58 which serve as closing members. Accordingly, the adhesion of dust and the like to the magnetic tape T wound on the reel 14 is prevented.

At the recording tape cartridge 10, the anchor spring 25, which presses the leader pin 22 such that the leader pin 22 does not further fall out from the pin holding portions 24, is disposed in a vicinity of the pin holding portions 24 (the opening 20). The anchor spring 25 is shaped as a plate spring formed by bending a metal plate. As shown in FIG. 2, upper and lower side edge portions of the anchor spring 25 are inserted into groove portions 23 provided at the front wall 12A and the inner surface of the case 12 in a vicinity of the opening 20. (The front wall 12A is the portions of the peripheral walls 16A, 18A where the outer surfaces face in the direction of arrow A.) A base portion 25A of the anchor spring 25 is held by pairs of upper and lower spring holding portions 27.

Distal ends of branched-off operation portions 25B abut the disc portions 22E between the annular grooves 22A, 22D of the leader pin 22, and push the disc portions 22E toward the inner sides of the pin holding portions 24. In this way, the leader pin 22 is held even more strongly so as to not fall out from the pin holding portions 24. Note that, when the leader pin 22 enters in and exits from the concave portions 24A, 24B of the pin holding portions 24, the operation portions 25B of the anchor spring 25 appropriately elastically deform so as to permit movement of the leader pin 22.

Figure 8:
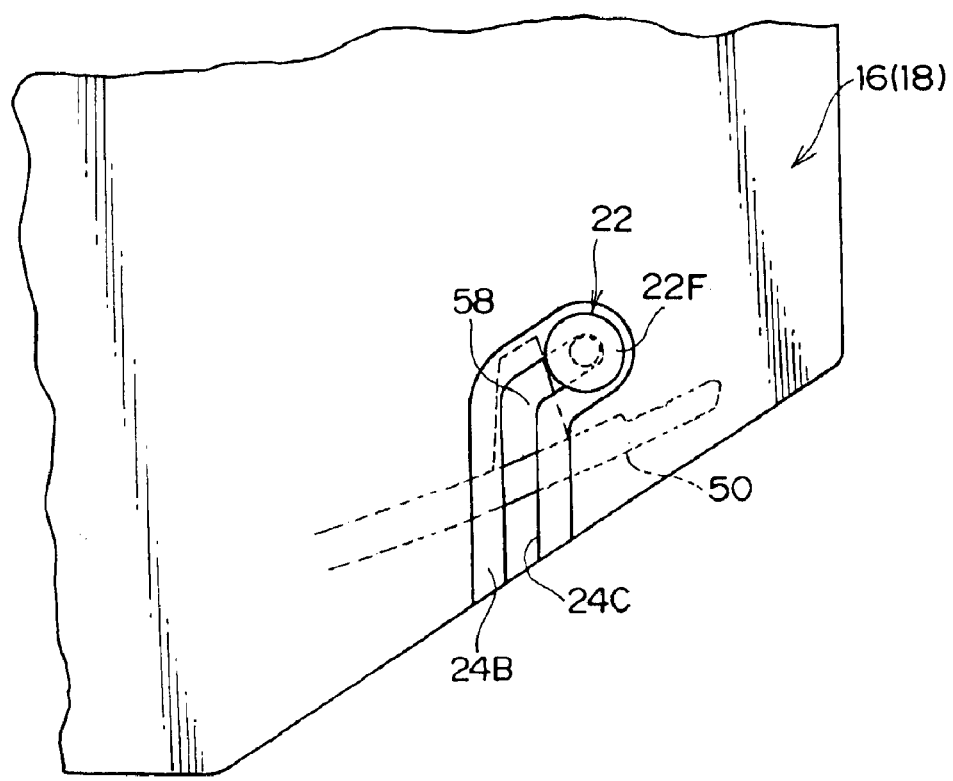
FIG. 8 is an enlarged schematic plan view showing a vicinity of another pin holding portion relating to another embodiment of the present invention.
Figure 9:
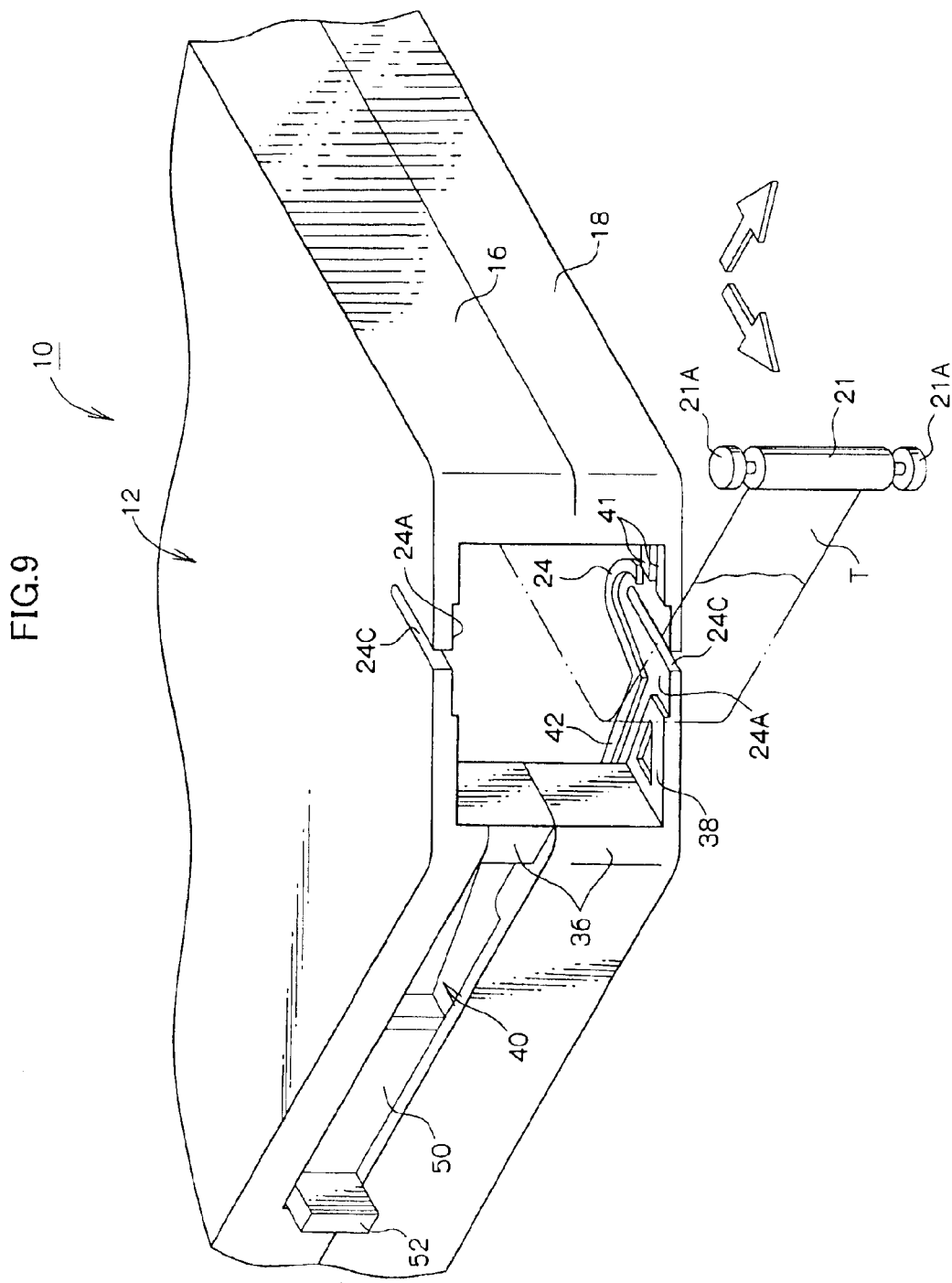
FIG. 9 is a schematic enlarged perspective view showing a state in a vicinity of an opening of a recording tape cartridge relating to still another embodiment of the present invention.
Figure 10:
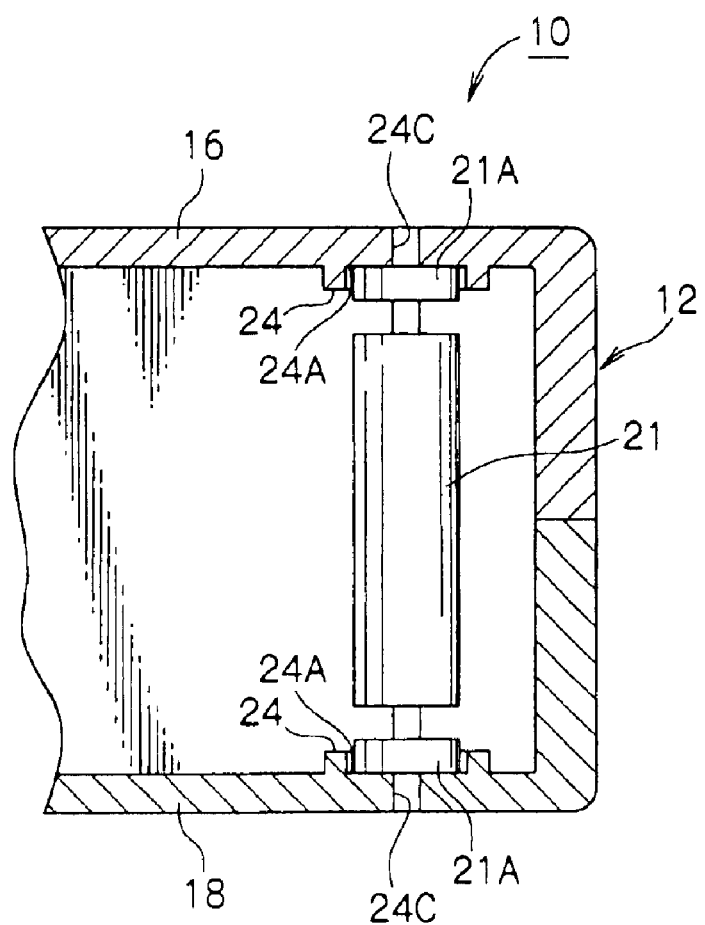
FIG. 10 is a schematic side sectional view showing a state in which a leader pin of FIG. 9 is held in a case.
Figure 11:
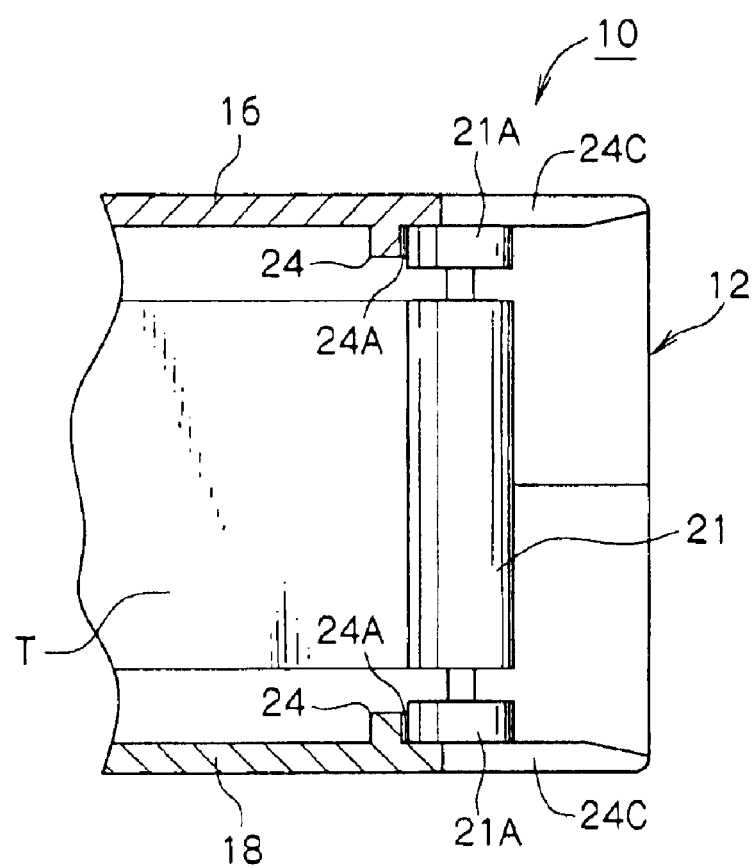
FIG. 11 is a schematic side sectional view showing the state in which the leader pin of FIG. 9 is held in the case.

Further, as shown in FIG. 8, the inner side end portions of the pin holding portions 24, i.e., the concave portions 24A, 24B and the cut-outs 24C, may be bent toward the front so as to form substantially J-shaped configurations in plan view, and the leader pin 22 may be pressed from the rear side by the stoppers 58 of the door 50 at the time when the opening 20 is closed. The stoppers 58 in this case are preferably formed to sizes such that they are able to substantially close the portions of the cut-outs 24C which are inward of the door 50 as seen in plan view. In this way, when the recording tape cartridge 10 is not being used (such as being stored or the like), dust and the like can be prevented from adhering to the magnetic tape T wound on the reel 14.

Note that the configurations of the concave portions 24A, 24B and the cut-outs 24C are not limited to the illustrated J shapes. The concave portions 24A, 24B and the cut-outs 24C may be formed in substantial L shapes in bottom view in which the inner side end portions thereof bend toward the front (or toward the rear), or may be formed in other curved configurations. In any case, if the aforementioned configurations are utilized, the case 12 (i.e., the upper case 16 and the lower case 18) can be provided with a simple leader pin locking function.

Next, operation of the present embodiment will be described. When the recording tape cartridge 10 having the above-described structure is not being used (e.g., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 enters into guide wall portions 41 in a vicinity of the inclined wall portions 30. Note that, at this time, the gaps of the cut-outs 24C are closed by the stoppers 58 of the door 50. Therefore, the dustproof quality of the recording tape cartridge 10 is ensured.

When the magnetic tape T is to be used, the recording tape cartridge 10 is loaded into a drive device along the direction of arrow A. Accompanying this loading, an opening/closing member (not illustrated) forming an opening/closing mechanism of the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56 (moves the operation projection 52 rearward relative to the case 12 which is loaded in the direction of arrow A).

Then, while the convex portions 51 are guided by the guide wall portions 42, the door 50, from which the operation projection 52 projects out, rotates clockwise as seen in plan view along the direction of curving thereof while the spring holding portion 54 is guided by the rib 57. Namely, due to the guide wall portions 42, the door 50 does not jut out from the locus of movement along the curved configuration thereof, but rather moves substantially rearward so as to circle around the outer sides of the pin holding portions 24 and the reel 14, and opens the opening 20. Then, when the case 12 (the recording tape cartridge 10) is loaded to a predetermined depth in the drive device, the opening 20 is completely opened.

In this state in which the opening 20 is opened, when the recording tape cartridge 10 is positioned within the drive device, further rotation (substantially rearward movement) of the door 50 is restricted. The pull-out mechanism of the drive device enters into the case 12 from the opening 20 which has been opened. The pull-out mechanism pulls-out the leader pin 22 which is positioned and held at the pin holding portions 24. At this time, the pull-out mechanism is anchored at the annular grooves 22A, the operation portions 25B of the anchor spring 25 elastically deform appropriately, and pulling-out of the leader pin 22 from the pin holding portions 24 is permitted.

Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

When the magnetic tape T is rewound onto the reel 14 and the leader pin 22 is to be held at the pin holding portions 24, the operation portions 25B of the anchor spring 25 elastically deform appropriately such that entry of the leader pin 22 into the pin holding portions 24, i.e., fitting of the annular grooves 22D with the thin portions 24D (insertion of the bottom portions (shaft portions) of the annular grooves 22D into the cut-outs 24C), is permitted. In this way, the anchor portions 22C are anchored at the concave portions 24A, 24B (the disc portions 22E are anchored at the pin holding portions 24), and the leader pin 22 is anchored and held in a vicinity of the opening 20 of the case 12.

Thereafter, when the recording tape cartridge 10 is to be ejected from the drive device, the positioned state of the recording tape cartridge 10 is released, and the recording tape cartridge 10 is moved in the direction opposite to the direction of arrow A by the urging force of the coil spring 56 or by an unillustrated ejecting mechanism. In this way, while the convex portions 51 of the door 50 are guided by the guide wall portions 42, the door 50 is rotated in the direction of closing the opening 20 by the urging force of the coil spring 56. Due to the distal end portion (front end portion) of the door 50 entering into the guide wall portions 41, the opening 20 is completely closed and returns to its initial state.

Here, as described above, the bottom portions (shaft portions) of the annular grooves 22D at the engaging portions 22C are permitted by the cut-outs 24C to fit together with the thin portions 24D between the concave portions 24A, 24B of the pin holding portions 24. The leader pin 22 is thereby anchored and held at the case 12 in a vicinity of the opening 20. Thus, the leader pin 22 spans between and joins the upper case 16 and the lower case 18, and the strength at this portion can be reinforced.

Namely, even if an impact due to a drop or the like is applied to the opening 20 portion of the case 12 and this portion attempts to flexurally deform toward the top and bottom outer sides, this deformation can be suppressed because the leader pin 22 spans between the upper case 16 and the lower case 18. Moreover, at this time, the leader pin 22 is anchored and held due to the anchor portions 22C being pressed by the concave portions 24A, 24B of the pin holding portions 24. Thus, the leader pin 22 can be prevented from falling out from the pin holding portions 24.

Next, the pin holding portions 24 shown in FIGS. 9 through 12B will be described. Note that, for convenience of explanation, structures other than the leader pin will be described by using the same reference numerals as in the above description. Further, because the operation is substantially the same as described above, detailed description thereof will be omitted. Only the concave portions 24A and the cut-outs 24C are provided at the pin holding portions 24, and the concave portions 24B are not provided. Further, a leader pin 21 is a conventionally known leader pin, and does not have the annular grooves 22D and the disc portions 22F of the anchor portions 22C. Namely, the uppermost and lowermost end portions of the leader pin 21 have only disc portions 21A corresponding to the disc portions 22E.

Figure 12A:
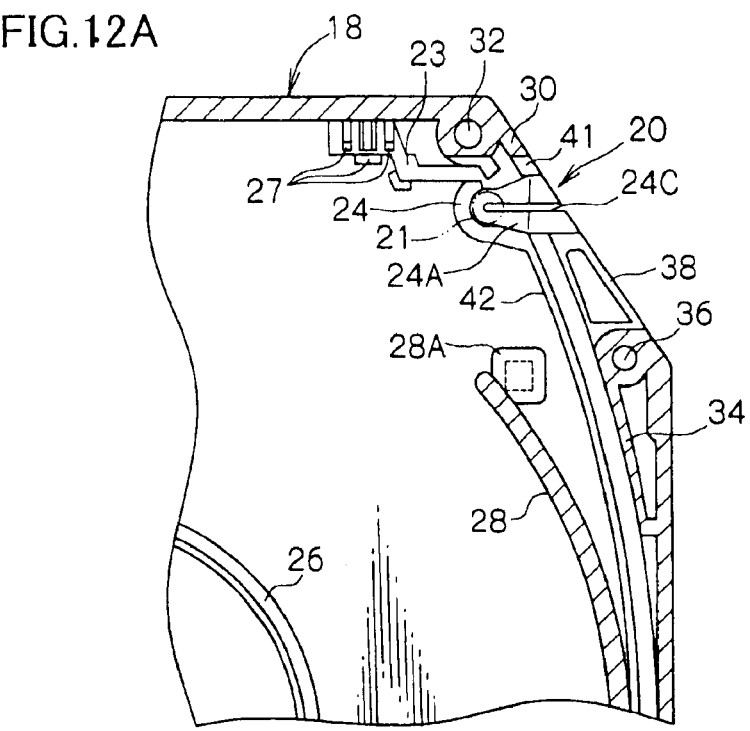
FIG. 12A is a schematic explanatory diagram showing a state in which the case deforms due to impact at the time when the recording tape cartridge relating to the embodiment of the present invention is dropped.
Figure 12B:
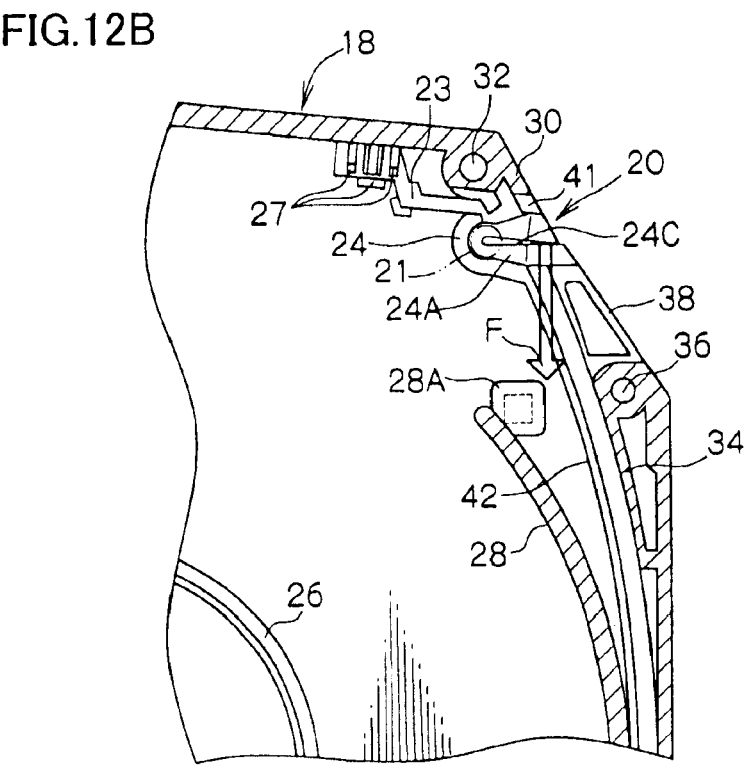
FIG. 12B is a schematic explanatory diagram showing a state in which the case deforms due to impact at the time when the recording tape cartridge relating to the embodiment of the present invention is dropped.

The cut-outs 24C are provided at the pin holding portions 24 which have such a structure. Thus, as shown in FIGS. 12A and 12B, it is easy for the concave portions 24A to flexurally deform with respect to the widthwise direction (the front-back and left-right directions) of the cut-outs 24C. Accordingly, when the recording tape cartridge 10 receives a front-back and left-right direction impact in a vicinity of the opening 20 due to the recording tape cartridge 10 being dropped or the like, the impact force can be absorbed by flexural deformation of the cut-out 24C portions. Accordingly, flexural deformation and breakage of other portions of the case 12 can be suppressed.

Moreover, the flexural deformation of the cut-out 24C portions at this time is deformation which narrows the widths of the cut-outs 24C as shown by arrow F in FIG. 12B. Therefore, the peripheral surfaces of both end portions 21A of the leader pin 21 are pressed and held so as to be held in the pin holding portions 24. Accordingly, it is possible to suppress falling-out of the leader pin 21 from the pin holding portions 24. Note that, when the cut-outs 24C are used only for absorbing a drop, the positions at which they are disposed are not limited to within the concave portions 24A of the pin holding portions 24. However, providing the cut-outs 24C in the concave portions 24A of the pin holding portions 24 is preferable in that it is possible to suppress falling-out of the leader pin 21 as described above.

In any case, whether the conventional leader pin 21 is being used or whether the above-described leader pin 22 is being used may be differentiated at the point in time when the recording tape cartridge 10 is removed from a library device or is loaded into a drive device. Namely, information regarding the configuration of the leader pin 21 or 22 may be stored in the memory board M. With such a structure, even if, for example, the recording tape cartridge 10 equipped with the leader pin 22 is erroneously loaded into a drive device which cannot receive such a recording tape cartridge 10, the recording tape cartridge 10 can be ejected quickly by reading this information from the memory board M. Accordingly, trouble such as breaking or malfunctioning or the like of the recording tape cartridge 10 or the drive device can be averted.

Note that, instead of storing information regarding the configuration of the leader pin 21 or 22 on the memory board M, whether the leader pin 21 or the leader pin 22 is being used can be identified by recording such information on a bar code or the like adhered to the surface of the recording tape cartridge 10 (the case 12), or by a hole formed in the surface of the recording tape cartridge 10 (the case 12), or the like.

Figure 13A:
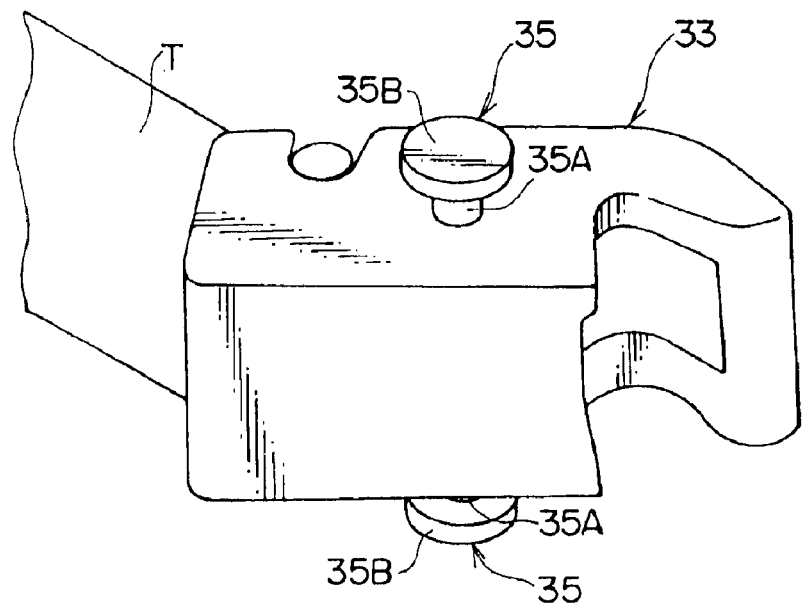
FIG. 13A is a schematic perspective view showing a leader block relating to still another embodiment of the present invention.

Further, in the above-described embodiments, the leader pins 21, 22 are used as the leader member. However, the leader member is not limited to the leader pins 21, 22. A leader block having the following type of configuration can similarly be made to span between the upper case 16 and the lower case 18. Namely, as shown in FIG. 13A for example, a pin 35 which is substantially T-shaped in side view can be formed to project at each of the top and bottom surfaces of a leader block 33, and annular grooves 35A and disc portions 35B, which are similar to the annular grooves 22D and the disc portions 22F of the leader pin 22, can be provided at the pins 35. In accordance with such a structure, the thin portions 24D formed at the upper case 16 and the lower case 18 can fit into the annular grooves 35A.

Figure 13B:
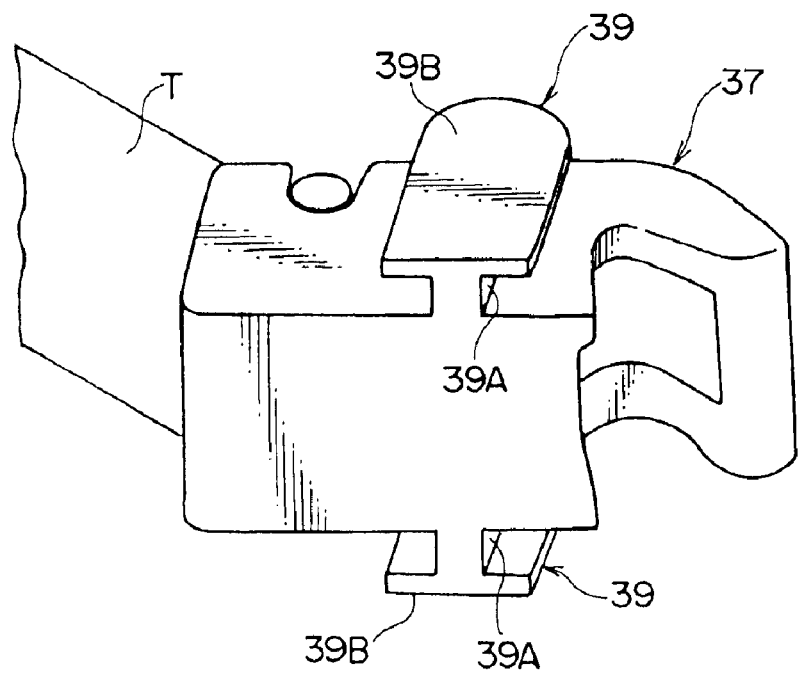
FIG. 13B is a schematic perspective view showing another leader block relating to still another embodiment of the present invention.
Figure 14:
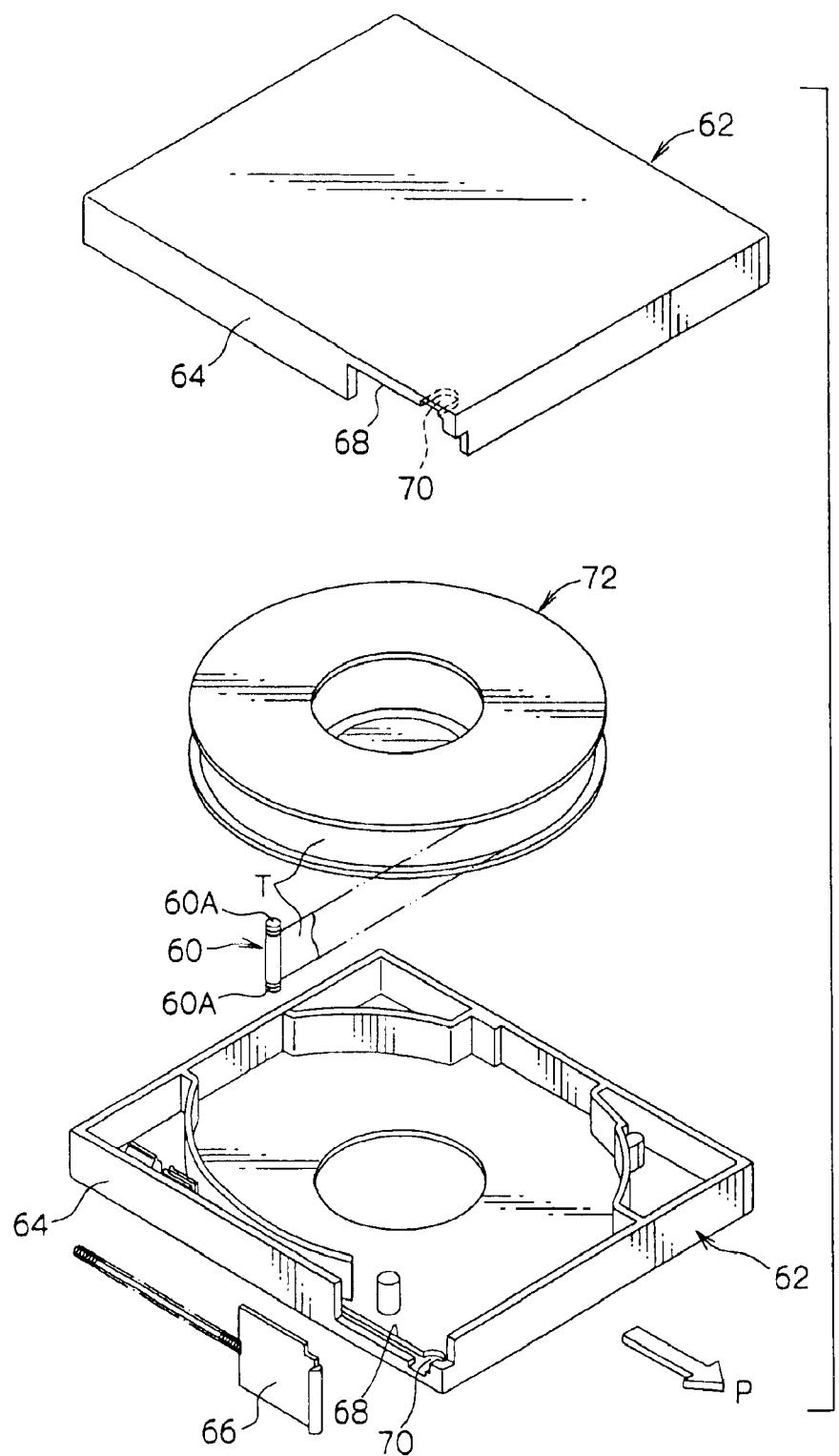
FIG. 14 is a schematic exploded perspective view of a conventional recording tape cartridge.

Moreover, as shown in FIG. 13B for example, an engaging portion 39 can be provided to project from each of the top and bottom surfaces of a leader block 37. The engaging portion 39 is substantially T-shaped in a side sectional view along the shorter side direction thereof, and has a configuration which matches the configuration of the concave portion 24B in plan view. Even if such a configuration is used, a groove portion 39A and a flat plate portion 39B, which exhibit effects similar to those of the annular groove 22D and the disc portion 22F of the leader pin 22, can be provided. Accordingly, the thin portions 24D formed at the upper case 16 and the lower case 18 can be made to fit into the groove portions 39A. Namely, if the leader blocks 33, 37 which have such configurations are used, they can be anchored and held at the case 12 similarly to the leader pin 22 (i.e., can span between and connect the upper case 16 and the lower case 18). Therefore, the same effects as those described above can be obtained.

As described above, in accordance with the present invention, a leader member, in an upright state, spans a case due to anchor portions being inserted, anchored and held in cut-outs provided from an opening toward holding portions. Thus, the leader member can suppress the flexural deformation of the case toward the top and bottom outer sides due to impact or the like at the time when the recording tape cartridge is dropped. Accordingly, breakage of the case can be suppressed, and it is possible to prevent the leader member from falling out from the holding portions.

What is claimed is:

1. A recording tape cartridge comprising:

a reel;

a recording tape, one end of the recording tape being anchored at the reel, and the recording tape being wound on the reel;

a leader member attached to another end of the recording tape;

a case having an opening for pulling-out of the leader member, the case rotatably accommodating the reel; and holding portions formed at a ceiling wall and a floor wall of the case, and holding the leader member in a vicinity of the opening, wherein the holding portions have cut-outs which are continuous from the opening, and wherein said cut-outs are defined by a through-slot that extends from an interior surface to an exterior surface of the respective ceiling wall and floor wall.

2. The recording tape cartridge of claim 1, wherein the leader member has an anchor portion at each end portion of the leader member, and the anchor portions are inserted into the cut-outs.

3. The recording tape cartridge of claim 1, wherein the holding portions are formed such that open sides of the cut-outs can elastically deform so as to narrow ends of the cut-outs that are continuous from the opening.

4. The recording tape cartridge of claim 1, further comprising closing members which close the cut-outs.

5. The recording tape cartridge of claim 2, further comprising holding members which hold the leader pin by abutting respective portions of the anchor portions.

6. The recording tape cartridge of claim 2, wherein the leader member comprises a leader pin.

7. The recording tape cartridge of claim 6, wherein each anchor portion has at least two convex portions and an annular groove between the at least two convex portions, and the leader pin is inserted into the cut-outs such that the annular grooves are disposed in the cut-outs.

8. The recording tape cartridge of claim 6, wherein the anchor portions are formed from extending portions which extend from both end portions of the leader pin in an axial direction of the leader pin, and the extending portions are inserted in the cut-outs.

9. A leader pin, in combination with a case, to which is fixed one end of a recording tape which is wound on a reel rotatably accommodated in a case which has an opening and cut-outs in a vicinity of the opening, said cut-outs extending from an interior surface of the case to an exterior surface of the case, said leader pin comprising:

a shaft portion;

a fixing portion which is provided coaxially with the shaft portion, and to which the one end of the recording tape is fixed; and anchor portions inserted into the cut-outs of the case.

10. The leader pin of claim 9, wherein the anchor portions are provided at both end portions of the shaft portion, and each anchor portion has at least two convex portions and an annular groove between the at least two convex portions, and the anchor portions are inserted into the cut-outs such that the annular grooves are disposed in the cut-outs.

11. The leader pin of claim 9, wherein the anchor portions are formed from extending portions which extend from both end portions of the shaft portion, and the extending portions are inserted in the cut-outs.

12. A method of manufacturing a recording tape cartridge having a case, said method comprising the steps of:

a. fixing and winding one end of a recording tape on a reel;

b. attaching a leader member, which has an anchor portion at each end portion of the leader member, to another end of the recording tape;

c. providing, at the case, an opening for pulling-out of the leader member;

d. providing cut-outs in a vicinity of the opening defined by a through-slot that extends from an interior surface of the case to an exterior surface of the case for holding the leader member in the vicinity of the opening; and e. accommodating the reel in the case.

13. The method of claim 12, wherein the cut-outs are provided at a ceiling surface and a floor surface of the case.

14. The method of claim 13, further comprising the step of inserting the anchor portions in the cut-outs.

15. The method of claim 14, further comprising the step of providing, at the case, holding portions which hold the leader member in a state in which the anchor portions are inserted in the cut-outs.

16. A method of holding a leader pin to which is fixed one end of a recording tape wound on a reel rotatably accommodated in a case, said method comprising the steps of:

a. inserting the leader pin in cut-outs of the case, said cut-outs being defined by a through-slot that extends from an interior surface of the case to an exterior surface of the case; and b. holding the leader pin by holding members.

* * * * *